(12) United States Patent
Nakamura

(10) Patent No.: US 11,441,946 B2
(45) Date of Patent: Sep. 13, 2022

(54) PROCESSING APPARATUS, IMAGE PICKUP APPARATUS, IMAGE PICKUP SYSTEM, AND PROCESSING METHOD

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/320,407

(22) Filed: May 14, 2021

(65) Prior Publication Data

US 2021/0381892 A1 Dec. 9, 2021

(30) Foreign Application Priority Data

Jun. 4, 2020 (JP) .............................. JP2020-097907

(51) Int. Cl.
*G01J 3/36* (2006.01)
*G01J 3/28* (2006.01)
*G01J 3/02* (2006.01)

(52) U.S. Cl.
CPC ........... *G01J 3/2803* (2013.01); *G01J 3/0208* (2013.01); *G01J 3/2823* (2013.01); *G01J 3/36* (2013.01); *G01J 2003/2806* (2013.01); *G01J 2003/2826* (2013.01)

(58) Field of Classification Search
CPC ...... G01J 3/2803; G01J 3/0208; G01J 3/2823; G01J 3/36; G01J 2003/2806; G01J 2003/2826; G01J 3/0289; G06T 5/00
See application file for complete search history.

(56) References Cited

U.S. PATENT DOCUMENTS

| 6,304,313 B1 * | 10/2001 | Honma ................... G06V 10/32 382/164 |
| 2006/0222260 A1 * | 10/2006 | Sambongi ............... G06T 5/006 382/274 |
| 2020/0412921 A1 | 12/2020 | Nakamura |

FOREIGN PATENT DOCUMENTS

| JP | 5910739 B2 | 4/2016 |
| JP | 2020-508469 A | 3/2020 |
| JP | 2020-064161 A | 4/2020 |
| WO | 2018/142295 A1 | 8/2018 |

\* cited by examiner

*Primary Examiner* — Abdullahi Nur
(74) *Attorney, Agent, or Firm* — Carter, DeLuca & Farrell LLP

(57) ABSTRACT

A processing apparatus combines a plurality of images based on a plurality of object images formed on an imaging plane of an image sensor by a plurality of lens units and to generate a combined image, and includes at least one processor or circuit that serves as an acquisition task configured to acquire information on a center position of each of the plurality of object images on the imaging plane, information on a correspondence relationship between the center position and positions of the plurality of images in the combined image, and conversion information for converting a first coordinate system in the imaging plane into a second coordinate system in the combined image, the conversion information being generated based on a correction function for correcting the plurality of object images, and a processing task configured to generate the combined image using the conversion information.

10 Claims, 5 Drawing Sheets

PROCESSING APPARATUS, IMAGE PICKUP APPARATUS, IMAGE PICKUP SYSTEM, AND PROCESSING METHOD

BACKGROUND OF THE INVENTION

Field of the Invention

The present invention relates to a processing apparatus, an image pickup apparatus, an image pickup system, and a processing method.

Description of the Related Art

A method of generating a combined image has conventionally been known by acquiring a plurality of images different from each other in single imaging using an optical system that forms a plurality of images of the same object with a plurality of lenses, and by staking (superimposing) the acquired plurality of images. Japanese Patent No. 5910739 discloses an image pickup apparatus that includes a filter array and a lens array after the objective lens, and can simultaneously acquire a plurality of images for generating a multiband image with a common image sensor.

In the image pickup apparatus disclosed in JP 5910739, a plurality of lens units in the lens array image light having different wavelengths from each other, and cause the distortion in a plurality of spectroscopic images and consequently a shift in positional information among the plurality of spectroscopic images. A correct result cannot be obtained by a spectroscopic analysis that uses the multiband image generated by stacking the plurality of spectroscopic images in which the positional information shifts.

SUMMARY OF THE INVENTION

The present invention provides a processing apparatus, an image pickup apparatus, an image pickup system, and a processing method, each of which can generate a good combined image.

A processing apparatus according to one aspect of the present invention is configured to combine a plurality of images based on a plurality of object images formed on an imaging plane of an image sensor by a plurality of lens units and to generate a combined image. The processing apparatus includes at least one processor or circuit configured to execute a plurality of tasks including an acquisition task configured to acquire information on a center position of each of the plurality of object images on the imaging plane, information on a correspondence relationship between the center position and positions of the plurality of images in the combined image, and conversion information for converting a first coordinate system in the imaging plane into a second coordinate system in the combined image, the conversion information being generated based on a correction function for correcting the plurality of object images, and a processing task configured to generate the combined image using the conversion information. At least one processor or circuit is configured to perform a function of at least one of the units. An image pickup apparatus and an image pickup system including the above processing apparatus and a processing method for a processing apparatus corresponding to the above processing apparatus also constitute another aspect of the present invention.

Further features of the present invention will become apparent from the following description of exemplary embodiments with reference to the attached drawings.

DESCRIPTION OF THE EMBODIMENTS

Figure 1A:
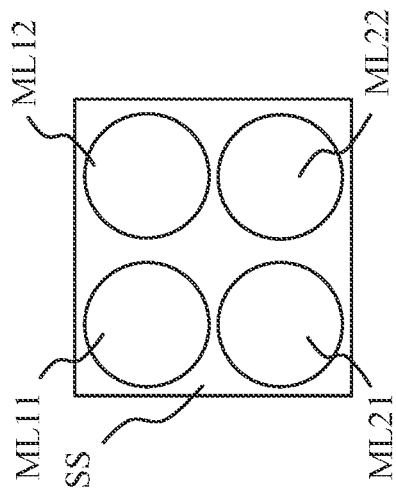
FIGS. 1A to 1D schematically illustrate an image pickup system according to a first embodiment.

Referring now to the accompanying drawings, a detailed description will be given of embodiments according to the present invention. Corresponding elements in respective figures will be designated by the same reference numerals, and a duplicate description thereof will be omitted.

First Embodiment

Figure 1B:
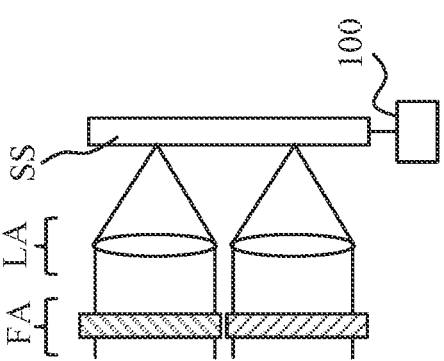

FIGS. 1A to 1D schematically illustrate an image pickup system according to this embodiment. FIG. 1A is a side view of the image pickup system, and FIG. 1B is a front view of the image pickup system viewed from the object side. The image pickup system includes an optical system, an image sensor SS, and a processor 100. The optical system includes a filter array FA (omitted in FIG. 1B) and a lens array LA. The image pickup system may include an optical apparatus including the optical system, and an image pickup apparatus that includes the image sensor SS and the processor 100 and is mountable with the optical apparatus.

Figure 1D:
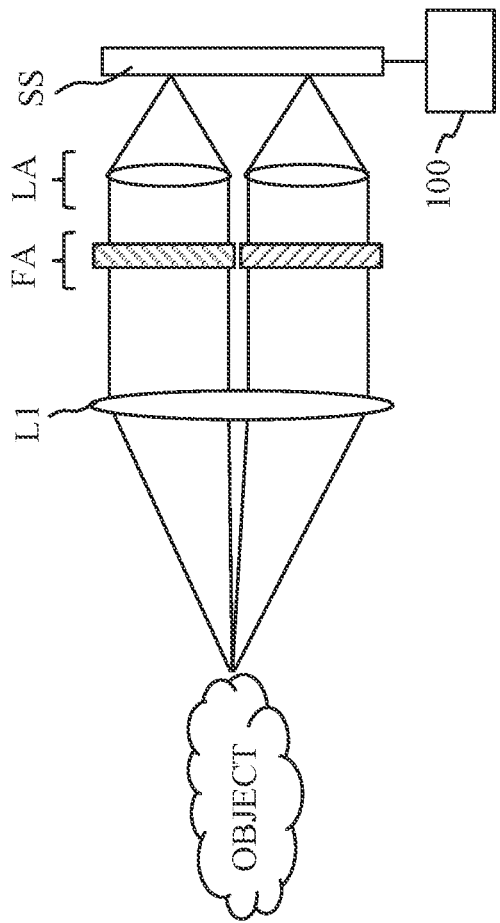
Figure 1C:
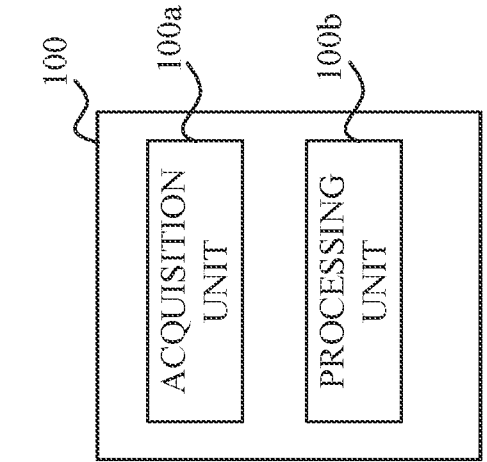

As illustrated in FIG. 1C, the processor 100 includes an acquisition unit (acquisition task) 100a and a processing unit (processing task) 100b. The processor 100 may further include a memory (not shown) for storing information acquired by the acquisition unit 100a and information generated (processed) by the processing unit 100b. Although the processor 100 is installed in the image pickup system in this embodiment, it may be configured as a processing apparatus separate from the image pickup system. The processor 100 may be installed in the image pickup apparatus or optical apparatus.

The lens array LA includes a 2×2 array lens unit (imaging unit) ML11, ML12, ML21, and ML22. This embodiment sets 2×2 lens units to the lens array LA for simple explanation, but the present invention is not limited to this example. Even when a plurality of lenses are disposed in an array, it serves as the lens array LA.

Since each lens unit is disposed and focused on the image sensor SS, the same object image is imaged (formed) on the imaging plane of the image sensor SS by the number of lens units. Since a plurality of object images are formed in a tile shape according to the arrangement of the lens units, the images formed by the lens units will be referred to as "tile images" in the following description. The tile image is developed around an intersection as a center position between the optical axis of the corresponding lens unit and the image sensor SS.

The filter array FA is disposed on the optical axis of the corresponding lens unit, and includes a plurality of bandpass filters having transmission characteristics different from each other. Making the transmission characteristics of the plurality of bandpass filters different from each other can develop a plurality of tile images of the same object and light having different wavelengths on the imaging plane. In other words, the image pickup system according to this embodiment can acquire a plurality of spectral images at once (simultaneously). Since the number of tile images (number of bands) is proportional to the number of bandpass filters and lens units, the number of bandpass filters and lens units may be increased or decreased according to the required number of bands.

The processor 100 generates a multiband image (combined image) by virtually stacking (superimposing or combining) a plurality of (spectroscopic) images based on a plurality of tile images acquired from the image sensor SS. A colored image acquired by a normal camera is generated by superimposing three-layer (R, G, B) spectroscopic images (two-dimensional luminance map) containing different color (spectral wavelength) information. On the other hand, the multiband image is generated by stacking spectroscopic images of more than three layers. An interval in the layer direction (wavelength direction) (increment of the spectral wavelength) corresponds to a wavelength resolution, and the number of layers (overall width of the wavelength) corresponds to a wavelength range. Although it depends on the data structure, a regular interval of the spectral wavelength and the spectral images arranged in descending or ascending order of the spectral wavelengths can provide a result easier to use for the analysis. The spectroscopic images of important spectral wavelengths may be arranged in front of the data to accelerate the analysis, or an irregular interval of the spectral wavelength may be used.

Given information on a correspondence between information on the center position of the tile image (center position information) and spectral wavelength information (layer position of the spectroscopic image in the multiband image), the multiband image stacked in the wavelength order follows. This embodiment stores, as stack information, the information on the correspondence between the center position information and the spectral wavelength information.

The configuration illustrated in FIG. 1A may need focusing of the lens array LA depending on the object distance. FIG. 1D illustrates a modified example of the image pickup system. In FIG. 1C, a focusing lens L1 having a larger aperture is disposed on the object side of the lens array LA. When an exit pupil of the lens L1 includes entrance pupils of all lens units in the lens array LA, an imaging relationship of the optical system is maintained. If this condition is satisfied, focusing can be achieved by simply disposing a lens having a short focal length while the lens array LA is fixed relative to the image sensor SS, particularly in imaging a close object.

The distortion of the lens unit will now be described. When the plurality of lens units have the same design, each image has a chromatic aberration when the plurality of lens units image light that has transmitted through different bandpass filters. In the chromatic aberrations, the lateral chromatic aberration is particularly observed as if the image height is expanded or contracted in comparison with each tile image. In other words, the lateral chromatic aberration viewed in the tile image is observed like the distortion, and image processing (image correction) cannot distinguish between the lateral chromatic aberration and the distortion. Therefore, the lateral chromatic aberration and the distortion in the (two-dimensional) spectroscopic imaging are collectively treated as the distortion. The multiband image can be generated by simply stacking a plurality of spectroscopic images acquired by the imaging sensor SS, but the distortion for each tile image causes a shift in positional information among the spectroscopic images. This shift appears as a color shift on the multiband image and may deteriorate the image quality of the multiband image. Therefore, even when the multiband image is used for the spectroscopic analysis, a correct result cannot be obtained.

Figure 2A:
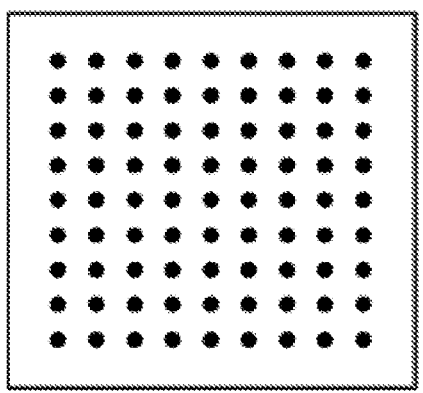
FIGS. 2A and 2B explain a distortion correcting method according to the first embodiment.
Figure 2B:
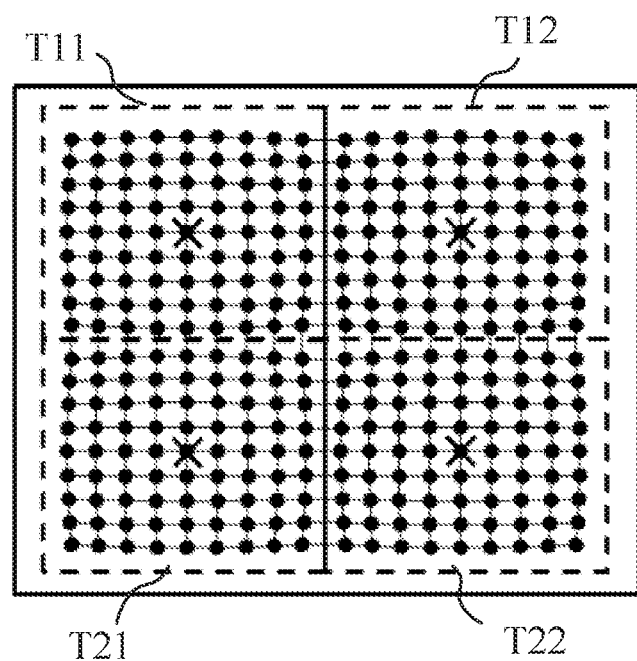

A description will now be given of a method for correcting the distortion. FIGS. 2A and 2B explain the distortion correcting method according to this embodiment. FIG. 2A illustrates a distortion correcting chart (referred to as a grid chart hereinafter) in which grid points (dots) are arranged in a grid pattern. FIG. 2B schematically illustrates tile images formed on the imaging plane when the grid chart is imaged by the image pickup system according to this embodiment.

As illustrated in FIG. 2B, the tile images corresponding to the lens units ML11, ML12, ML21, and ML22 are formed in sections T11, T12, T21, and T22 shown by the broken lines on the imaging plane, respectively. For better understanding, a distortion amount is exaggerated, and the grid points in the grid chart image are connected by lines. The center position of the tile image is expressed by a symbol X. The distortion correction using a grid chart is realized by searching for a set of a correction function and a coefficient in which the positions of the grid points in the grid chart image are orthogonally returned. In order to correct the distortion of the tile image, this embodiment divides the tile image from the entire image acquired by the image sensor SS, and generates a set of the correction function and the coefficient in the coordinate system based on the center position of the tile image. The number of sets of the correction function and the coefficient is as many as the number of tile images. The information (array) obtained by the correction function and the coefficient indicates to which coordinate the original coordinate in the tile image including the distortion should be corrected. Information $Y_t$ on the position of the corrected tile image in the tile coordinate system in the tile image is expressed by the following equation (1):

$$Y_t = F_t(X_t - X_{ct}) \quad (1)$$

where t is the tile image number (tile number), $X_t$ is information on the position of the tile image in the sensor coordinate system (first coordinate system) in the imaging plane, $X_{ct}$ is information on the center position of the tile image in the sensor coordinate system, and $F_t$ is the correction function (including the coefficient) for correcting the tile image.

Given the information $X_{ct}$ on the center position of the tile image and the correction function $F_t$ as a result of the preliminary calibration, the information $Y_t$ on the position of the corrected tile image can be obtained. In the subsequent imaging, the distortion is corrected for each tile image based on the information $Y_t$ on the position of the corrected tile image, and the multiband image is generated by superimposing images based on the corrected tile images. Since the number of divisions of the tile image and the number of distortion correcting calculations increase in proportion to the number of tile images, the multiband image generating speed decreases. When a motion image is generated using the multiband image and the generating speed of a single multiband image (1 frame) decreases, the frame rate decreases.

Figure 3A:
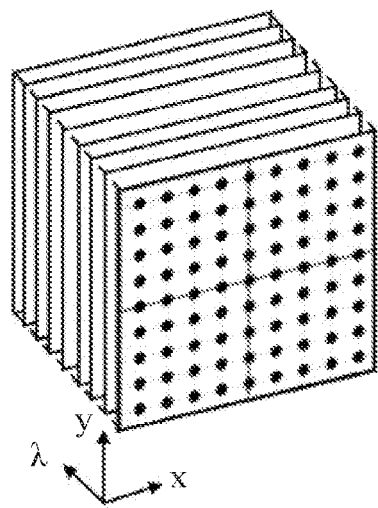
FIGS. 3A to 3C schematically illustrate a data structure of a multiband image.
Figure 3B:
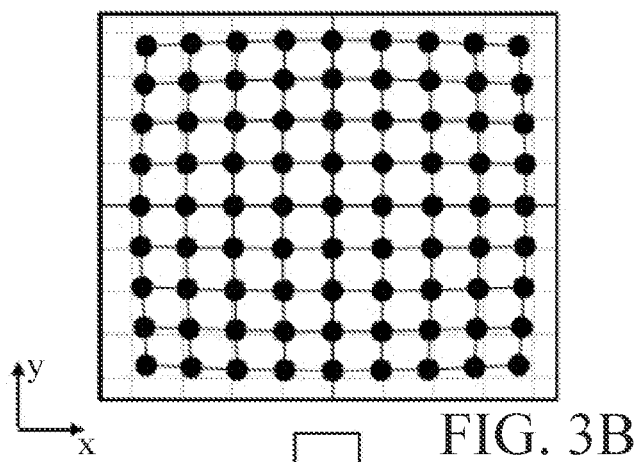
Figure 3C:
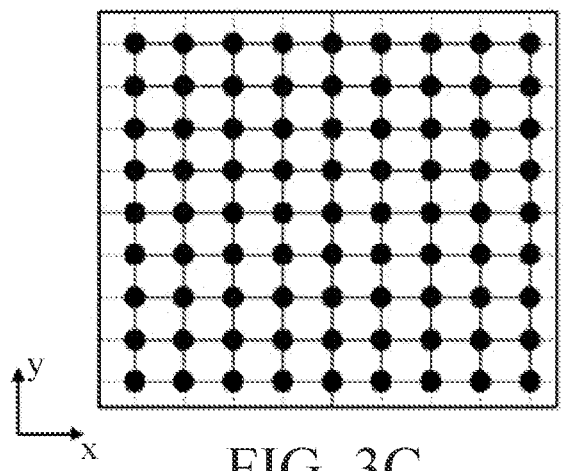

A description will now be given of the distortion correcting method that restrains the multiband image generating speed from lowering even if the number of tile images increases. FIGS. 3A to 3C schematically illustrate a data structure of the multiband image. When images based on two-dimensional tile images are stacked in order of wavelength, the multiband image can be expressed by a three-dimensional data structure using an x-axis and a y-axis for representing the spectroscopic image and a λ-axis for representing the wavelength, as illustrated in FIG. 3A. This three-dimensional data structure will be referred to as a "data cube." FIG. 3A illustrates an ideal data cube. In the data cube illustrated in FIG. 3A, the distortion and the like are sufficiently corrected, and the positional information is correct (or is not shifted). Each pixel value (luminance) in the multiband image discretely exists on the three-dimensional coordinate grid point. This is similarly applied to any of the x-axis, y-axis, and λ-axis, and it can be interpreted that only the number of divisions (resolution) is different.

The expression (1) is an operation formula that converts the information $X_t$ on the position of the tile image in the sensor coordinate system into the information $Y_t$ on the position of the corrected tile image in the tile coordinate system. In the expression (1), the correction function $F_t$ corresponds to a correction coefficient, and the information $X_{ct}$ on the position of the center position of the tile image in the sensor coordinate system corresponds to an offset. FIGS. 3B and 3C illustrate pre-correction and post-correction tile images, respectively. A multiband image is generated by stacking images based on the corrected tile image in the wavelength order. Internal processing corresponds to mapping all pixels on the image based on the corrected tile image onto the three-dimensional image. This mapping can be realized given the correspondence information between the tile number t in the expression (1) and the coordinate (layer position) on the λ-axis. In summary, the destination (address on the data cube) of each pixel value on the imaging plane is determined once the correction function is determined. Information Z on the position in the data cube coordinate system is expressed by the following expression (2):

$$Z=GF(X-X_c) \qquad (2)$$

where X is information on the position of the tile image in the sensor coordinate system, $X_c$ is information on the center position of the tile image in the sensor coordinate system, F is a matrix representing the distortion correction (coordinate transformation) of the tile image, and G is a matrix for converting the tile coordinate system into the data cube coordinate system (second coordinate system) in the multiband image.

The expression (2) can be used to convert the information X on the position of the tile image in the sensor coordinate system into the information Z on the position in the data cube coordinate system without using the tile number t. Since the matrices F and G are linear transformation matrices, the expression (2) can be turned into the following expression (3):

$$Z=H(X-X_c) \qquad (3)$$

where H (conversion information) is a matrix that collectively expresses the matrices F and G for converting one sensor coordinate system into the data cube coordinate system.

By using the expression (3), the image acquired by a single calculation can be divided into tile images and expanded on the data cube. Since only the calculation for the sensor coordinate system is required, a calculation amount is constant without being affected by the increase or decrease of the number of tile images. By acquiring the matrix H and the information $X_c$ generated during the calibration or the information X and Z, the acquired image can be converted into a multiband image at a high speed. Since the above calculation is a linear transformation, it can be easily incorporated into a parallel computer (GPU or FPGA).

Figure 4:
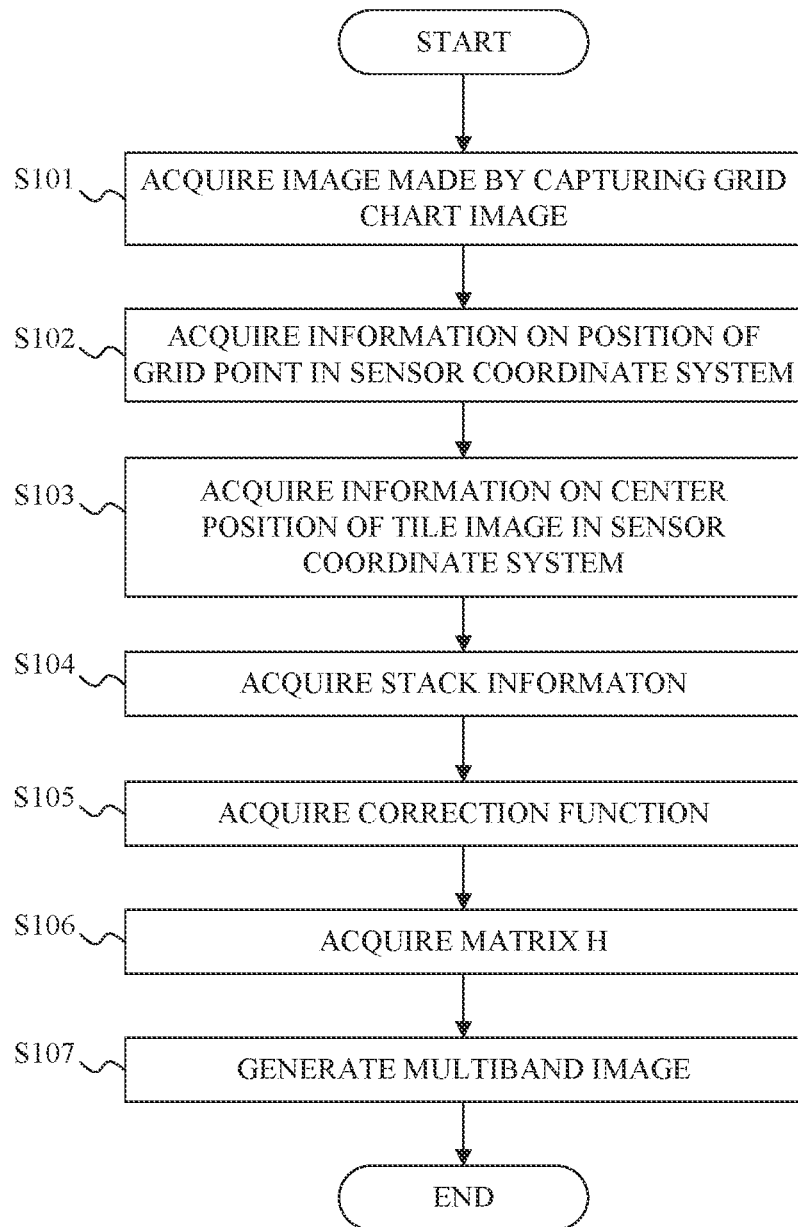
FIG. 4 is a flowchart showing a method of converting an image acquired in the first embodiment into a multiband image.

FIG. 4 is a flowchart showing a method of converting an image acquired in this embodiment into a multiband image.

In the step S101, the processor 100 (acquisition unit 100a) acquires an image made by capturing a grid chart image from the image sensor SS. In this embodiment, the grid chart illustrated in FIG. 2A is used.

In the step S102, the processor 100 (acquisition unit 100a) acquires information on the positions of the grid points of the grid chart in the sensor coordinate system. The information on the positions of the grid points is distortion information. In this embodiment, a dot is disposed at the grid point, but its type is not limited as long as distortion information can be obtained. A dot coordinate can be obtained at a relatively high speed using a Hough transform or the like.

In the step S103, the processor 100 (acquisition unit 100a) acquires information on the center position of the tile image in the sensor coordinate system. The processor 100 may calculate the information on the center position of the tile image using the information on the positions of the grid points for each division, or may acquire the information from another means. The grid chart may be captured so as to fill the angle of view of each tile image, and the center coordinate of the grid chart may be substituted for information on the center position of the tile image. This embodiment uses a grid chart consisting of 9×9 grid points, and thus the center coordinate of the grid point.

In the step S104, the processor 100 (acquisition unit 100a) acquires stack information which is information on the correspondence between the information on the center position of the tile image in the sensor coordinate system and the spectral wavelength information (layer position in the spectroscopic image in the multiband image).

In the step S105, the processor 100 (acquisition unit 100a) acquires a correction function (including a coefficient) for correcting the tile image.

In the step S106, the processor 100 (acquisition unit 100a) acquires the matrix H as the conversion information used to convert into the data cube coordinate system the sensor coordinate system generated based on the information on the center position of the tile image in the sensor coordinate system, the stack information, and the correction function. The processing unit 100b may generate the matrix H.

In the step S107, the processor 100 (processing unit 100b) generates a multiband image using the object image acquired from the image sensor SS, and the matrix H.

In this embodiment, the distortion information of the optical system is acquired by capturing the grid chart with an actual machine, but may be acquired by using a simulation or a design value. If the manufacturing error of the optical system can be sufficiently reduced, the distortion map calculated for each tile image may be used as information on the positions of the grid points for each tile image. As long as the information on the center position of the tile image in the sensor coordinate system can be accurately acquired, the information generated from the optical design value of the lens unit may be used as the information on the positions of the grid points in the tile coordinate system.

As described above, the configuration of this embodiment can acquire a good combined image (multiband image) at a high speed.

Second Embodiment

A basic configuration of the image pickup system according to this embodiment is the same as that of the first embodiment. This embodiment will discuss only the differences from the first embodiment.

The configuration according to this embodiment simultaneously corrects a luminance decrease around the object image or so-called shading. This embodiment corrects shading based on not only vignetting of the optical system and the sensitivity characteristic of the image sensor SS relative to the light incident angle, but also the transmission characteristic of the bandpass filter relative to the incident angle.

The simplest shading correction is a method for capturing a white object on the entire surface and for generating a luminance correcting map (correction information) backwardly calculated so that the in-plane luminance distribution of each tile image becomes constant. This embodiment uses the filter array FA including different types of bandpass filters, and thus the white color here may be white (reflectance is constant within the use wavelength) over the entire use wavelength. The luminance correcting map may not be divided for each tile image and may be used in the form of the sensor coordinate system. When the pixel value is coordinate-converted using the expression (3), the luminance correcting map is simultaneously coordinate-converted and thereby shading is simultaneously corrected. Before the distortion correction (coordinate conversion) is performed, the shading may be corrected on the entire image previously acquired from the image sensor SS by using the luminance correcting map. This method only performs a simple multiplication, has a small calculation load, and is not affected by an increase or decrease of the number of tile images.

As described above, the configuration according to this embodiment can correct shading at a high speed, in addition to the effect of the first embodiment.

Third Embodiment

The first embodiment has discussed a method of correcting the chromatic aberration generated in the lens array, but this embodiment will discuss a method of correcting different aberrations.

Figure 5:
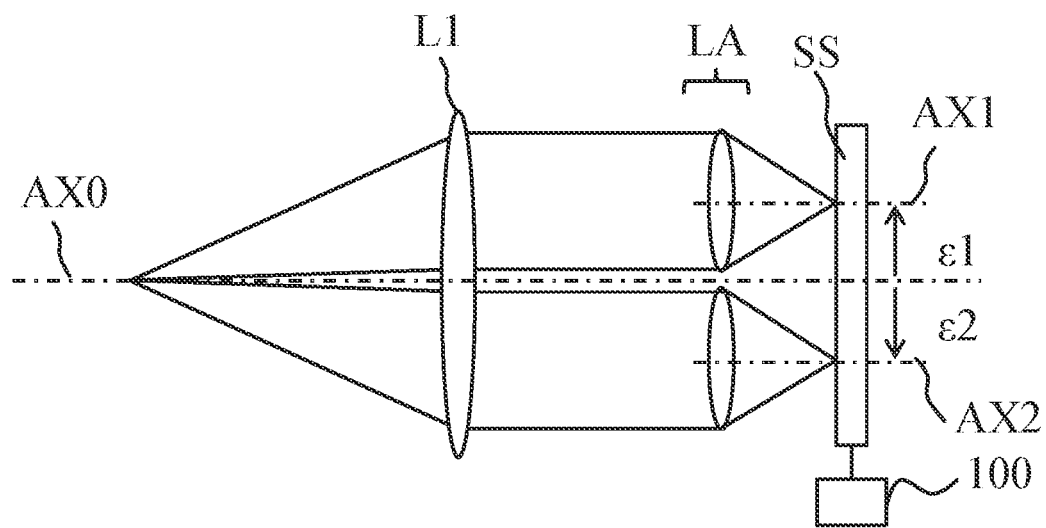
FIG. 5 schematically illustrates an image pickup system according to a third embodiment.

FIG. 5 schematically illustrates an image pickup system according to this embodiment. The image pickup system includes an optical system, an image sensor SS, and a processor 100. The optical system includes a lens L1, a filter array FA (omitted in FIG. 5 for simple explanation), and a lens array LA.

When a common optical system such as the lens L1 (referred to as a "main optical system" hereinafter) is disposed on the object side of the lens array LA, optical axes (labelled as AX1 and AX2 in FIG. 5) of the lens units in the lens array LA shift from an optical axis (main optical axis) AX0 of the main optical system. Thus, many lens units in the lens array LA have different eccentric distortions depending on the distance and direction from the main optical axis AX0. In an attempt to correct an eccentric distortion that differs for each tile image, a calculation load will increase because it is necessary to calculate a displacement in the information on all the positions in the tile image, and a large memory capacity is necessary to store the information on the distorted position.

This embodiment reduces a data amount from the viewpoint of geometrical optics. A shift amount (eccentric component) of the lens unit in the vertical direction from the main optical axis AX0 is considered as a vector and is defined as an "eccentric amount ε." When the eccentricity ε is 0, that is, when the optical axis of the lens unit is located on the main optical axis AX0, the distortion of the tile image captured by the lens unit becomes symmetrical with respect to the optical axis, so the correction function can be described with a single variable as an angle of view ω. The distortion of the tile image formed by the lens unit when the eccentricity ε is 0 will be referred to as a "reference distortion."

Figure 6:
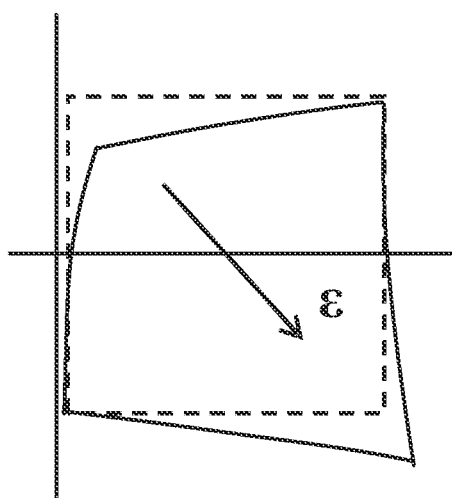
FIG. 6 explains an eccentric distortion.

It is known that the eccentric distortion is proportional to the product of the eccentric amount ε and the square of the angle of view ω. FIG. 6 explains the eccentric distortion. In FIG. 6, the displacement amount is exaggerated. The image is deformed (eccentrically distorted) by the amount and direction determined by the eccentric amount ε. The magnitude of the deformation amount can be expressed by a coefficient. In summary, the total distortion of the tile image formed by the lens unit disposed at the eccentric position can be approximated by the product of the reference distortion component and the eccentric distortion component. A tile image correction function $f_{di}$ is expressed by the following expression (4):

$$F_{di}(x_i,y_i)=f_1(\omega_i)\times f_2(\varepsilon_i) \tag{4}$$

where i is a tile number, $x_i$ and $y_i$ represent information on the corrected position in the tile image in the sensor coordinate system, $\omega_i$ is an angle of view in the tile image, and $\varepsilon_i$ is an eccentric amount of the lens unit from the main optical axis corresponding to the tile image, $f_1$ is a function including a reference distortion component (angle of view component), and $f_2$ is a function including an eccentric distortion component (shift amount component).

Backwardly calculating and assigning the coefficients suitable for the functions f1 and f2 can generate a correction function for the eccentric distortion of the tile image. Thus, the correction amount of the reference distortion is previously calculated and stored as one-dimensional data of the angle of view ω, and thereby the distortion correction amount of the tile image can be generated by a simple calculation.

As described above, the configuration according to this embodiment can correct an eccentric distortion with a small data amount.

Fourth Embodiment

As described in the first embodiment, the lateral chromatic aberration generated in the lens unit in the lens array LA can be collectively treated as the distortion in the image processing, and thus can be corrected by the same function as that of the distortion correction. The lateral chromatic aberration is generally expressed by the difference from the image height of the reference wavelength. The correction function of the tile image is expressed with a function $f_{ci}$ representing a distortion component of the tile image at a reference wavelength where an arbitrary tile image is imaged at the reference wavelength, and a function $f_3$ representing a distortion component (deformed component) caused by the lateral chromatic aberration of the spectral wavelength. The distortion correction function $f_{di}$ of the tile image is expressed by the following expression (5):

$$f_{di}(x_i,y_i)=f_{ci}(x_{0i},y_{0i},\lambda_0)\times f_3(\lambda_i) \tag{5}$$

where i is a tile number, $x_i$ and $y_i$ include information on post-correction position in the tile image in the sensor coordinate system, $x_{0i}$ and $y_{0i}$ include information on pre-correction position in the tile image in the sensor coordinate system, $\lambda_0$ is the reference wavelength, and $\lambda_i$ is an imaging wavelength of the tile image.

Since the distortion component caused by the lateral chromatic aberration can be treated independently of the eccentric distortion in the third embodiment, the distortion correction function $f_i(x_i, y_i)$ is expressed by the following expression (6) in combination with the third embodiment.

$$f_{di}(x_i,y_i)=f_1(\omega_i)\times f_2(\varepsilon_i)\times f_3(\lambda_i) \quad (6)$$

where $f_{di}$ is a distortion correction function of the tile image (i), $x_i$ and $y_i$ include information on post-correction position in the tile image (i) in the sensor coordinate system, $f_1$ is a function representing a reference distortion component, $\omega_i$ is an angle of view in the tile image, $f_2$ is a function representing an eccentric distortion component caused by an eccentric amount $\varepsilon_i$, and $\varepsilon_i$ is an eccentric amount (shift amount) [mm] from the main optical axis in the vertical direction.

As described above, the configuration according to this embodiment can correct the lateral chromatic aberration with a small data amount.

Each embodiment corrects the distortion generated by the filter array FA, but the present invention is applicable to a correction of the distortion generated by the lens array LA. For example, when the lens units in the lens array LA are manufactured with different designs, the distortions generated in the plurality of tile images are different from each other.

The above embodiment can provide a processing apparatus, an image pickup apparatus, an image pickup system, and a processing method, each of which can generate a good combined image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-097907, filed on Jun. 4, 2020 which is hereby incorporated by reference herein in its entirety.

What is claimed is:

1. A processing apparatus configured to combine a plurality of images based on a plurality of object images formed on an imaging plane of an image sensor by a plurality of lens units and to generate a combined image, the processing apparatus comprising: at least one processor or circuit configured to execute a plurality of tasks including:
    an acquisition task configured to acquire information on a center position of each of the plurality of object images on the imaging plane, information on a correspondence relationship between the center position and positions of the plurality of images in the combined image, and conversion information for converting a first coordinate system in the imaging plane into a second coordinate system in the combined image, the conversion information being generated based on a correction function for correcting the plurality of object images; and
    a processing task configured to generate the combined image using the conversion information.

2. The processing apparatus according to claim 1, wherein the acquisition task acquires correction information for correcting an in-plane luminance distribution of an image corresponding to each of the plurality of object images, and
    wherein the processing task corrects the image corresponding to each of the plurality of object images using the correction information.

3. The processing apparatus according to claim 1, further comprising a memory configured to store the conversion information.

4. An image pickup apparatus comprising:
    the processing apparatus according to claim 1; and
    the image sensor configured to generate the plurality of images.

5. An image pickup system comprising:
    the image pickup apparatus according to claim 4; and
    an optical system that includes the plurality of lens units.

6. The image pickup system according to claim 5, wherein the optical system includes a plurality of filters disposed on optical axes of the plurality of lens units and having transmission characteristics different from each other.

7. The image pickup system according to claim 6, wherein the correction function includes a function including a deformation component caused by a lateral chromatic aberration of each of the plurality of object images, and a function including a distortion component of each of the plurality of object images at a reference wavelength.

8. The image pickup system according to claim 5, wherein the optical system includes a main optical system on an object side of the plurality of lens units.

9. The image pickup system according to claim 8, wherein the correction function includes a function including an angle of view component of each of the plurality of object images, and a function including a component of a shift amount between an optical axis of the main optical system and an optical axis of each of the plurality of lens units.

10. A processing method for a processing apparatus configured to combine a plurality of images based on a plurality of object images formed on an imaging plane of an image sensor by a plurality of lens units and to generate a combined image, the processing method comprising:
    acquiring information on a center position of each of the plurality of object images on the imaging plane, information on a correspondence relationship between the center position and positions of the plurality of images in the combined image, and conversion information for converting a first coordinate system in the imaging plane into a second coordinate system in the combined image, the conversion information being generated based on a correction function for correcting the plurality of object images; and generating the combined image using the conversion information.

\* \* \* \* \*